United States Patent

[11] 3,591,240

| [72] | Inventor | Errol V. Seymour |
| | | Houston, Tex. |
| [21] | Appl. No. | 809,316 |
| [22] | Filed | Mar. 21, 1969 |
| [45] | Patented | July 6, 1971 |
| [73] | Assignee | Shell Oil Company |
| | | New York, N.Y. |

[54] VALVED BYPASS ARRANGEMENT FOR PREVENTING PIPELINE SLUMPING
9 Claims, 3 Drawing Figs.
[52] U.S. Cl. ................................................. 302/14,
302/66
[51] Int. Cl. ...................................................... B65g 53/04
[50] Field of Search ........................................... 302/14, 15,
16, 32, 64, 66

[56] References Cited
UNITED STATES PATENTS
| 562,232 | 6/1896 | Miller............................ | 302/14 |
| 2,631,899 | 3/1953 | Jullien........................... | 302/14 |

Primary Examiner—Andres H. Nielsen
Attorneys—Thomas R. Lampe and J. H. McCarthy

ABSTRACT: Method and apparatus for preventing downhill slumping in a shut-down slurry pipeline. Automatic shutoff valves are placed along the sloping portions of the pipe and at each valve location an alternate slurry path is provided, said path offering resistance to the slurry flow sufficient to prevent movement of the slurry when the only driving force is gravity. The alternate slurry path has sufficient storage capacity to accommodate and retain slurry material therein against downward movement in the pipeline, said slurry material having been introduced into the path upon pipeline shutdown.

PATENTED JUL 6 1971 3,591,240

INVENTOR:
E. V. SEYMOUR
BY:
Thomas R. Lampe
HIS ATTORNEY

VALVED BYPASS ARRANGEMENT FOR PREVENTING PIPELINE SLUMPING

The present invention relates to pipeline transport operations; and, more particularly, to a method and apparatus for preventing the downward movement of slurry solids in an inclined portion of pipeline during a shutdown period.

Transportation by pipeline is a major and growing industry. With the use thereof formerly confined almost entirely to movement of water, gas and petroleum products, pipelines, with the advent of slurry transport, have become useful for long and short hauls of a wide variety of raw materials and finished products.

With respect to the pipeline transportation of materials in slurry form, problems arise when such materials are moved through pipelines inclined to go over a hill or down into a valley. At these locations, during a planned or emergency line shutdown, the solids of the transported slurry may settle out vertically and subsequently slide down the inclined portions of the pipeline, thereby causing a compacted plug which may be very difficult to dislodge and move when line shutdown is terminated and transport activities are resumed.

These difficulties are most commonly avoided by laying solids-carrying or slurry pipelines so that they do not exceed a slope or angle of inclination below which sliding does not occur. Alternatively, the inclined pipeline sections are emptied at each shutdown. Obviously, these alternative prior art approaches are not always feasible or economical, especially in those situations where long and relatively steep slopes are encountered. Slopes of this nature are being encountered with increasing frequency as pipeline operations are being extended to new, relatively inaccessible mountainous areas in the United States and elsewhere.

SUMMARY OF THE INVENTION

It is therefore a primary object of the present invention to provide an improved and economical apparatus and method whereby slurry material being transported in an inclined pipeline section is prevented from slumping during a line shutdown.

This and other objects have been attained in the present invention by providing a method and apparatus for preventing downhill slumping in a shutdown slurry pipeline wherein automatic shutoff valves are located at predetermined intervals along sloping portions of the pipeline, said valves being set to close automatically when the pipeline flow rate falls below some predetermined minimum value. In the vicinity of each shutoff valve, a bypass line is provided for the slurry to take an alternate flow path upon closing of the valve. The alternate flow path is adapted to offer resistance to the flow of such magnitude so as to prevent downward movement of the solids in the slurry when the only driving force is gravity. To accomplish this, the alternate flow path must define a storage capacity sufficient to accommodate and retain slurry material therein against downward movement in the pipeline, said slurry material having been introduced into the flow path. When the shutoff valve closes, no surge is introduced into the pipeline because the bypass line provides an alternate path for material flow while the pipeline slows down from its operating velocity to an average flow rate of zero. Thus, the shutoff valve requires no elaborate closing sequence.

DESCRIPTION OF THE DRAWING

The above-noted and other objects of the present invention will be understood from the following description, taken with reference to the accompanying drawing. In describing the invention in detail, reference will be made to the drawing in which like reference numerals designate corresponding parts throughout several views in which:

Referring now to FIG. 1, a given length of slurry pipeline 11 is illustrated in the position assumed thereby as the pipeline proceeds to and from a valley formed between two hills or mountains 12 and 13. The terrain illustrated is typical of that encountered in pipeline laying activities, although it should be understood that the teachings of the present invention may be carried out in any topographical configuration wherein a portion of slurry pipeline is inclined.

Figure 1:
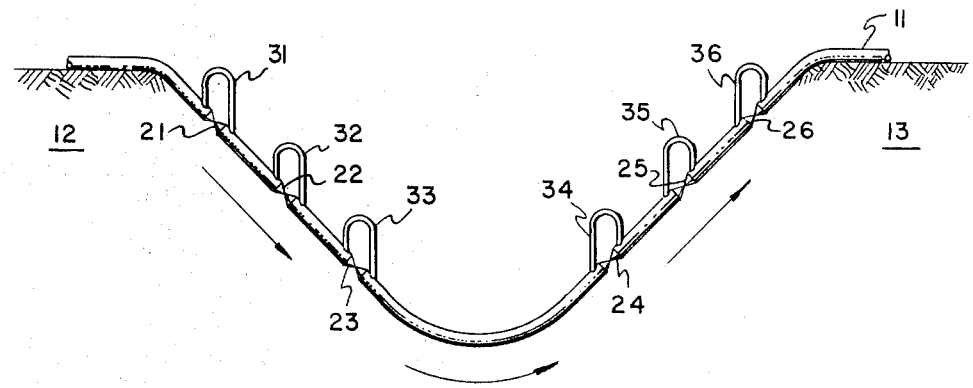
FIG. 1 is a diagrammatic view illustrating a given length of slurry pipeline which has been modified in accordance with the teachings of the present invention.

The transportation of slurries consisting of solid particles in a fluid medium by use of pipelines similar to that disclosed in FIG. 1 is quite well known, and such expedient is finding increasing use, especially in those situations where the source of raw materials is relatively remote and inaccessible from the point of delivery, which may be a suitable processing plant, for example. In the disclosed arrangement, it may be assumed for purposes of illustration that the slurry material being transferred through pipeline 11 as by means of conventional pumps (not shown) is moving through the line in the direction indicated by the arrows. However, the teachings of the present invention are, of course, applicable regardless of the direction of flow of the slurry.

As long as flow continues in the pipeline, the solid matter of the slurry will remain in suspension within the pumped liquid, even when the solid matter has a higher specific gravity than the liquid. If, however, the flow is stopped for any reason, i.e., the pipeline is shut down, such solid matter will settle out of suspension. In the situation where the line is horizontal or the slope of the line is insufficient to cause sliding of the settled solids, no problem is created by such settling out. Under these conditions, a liquid-rich channel remains open at the top of the line which allows the settled material to be resuspended with a minimum of difficulty upon resumption of slurry flow.

A serious problem can exist when the pipeline must be inclined to go over a hill or down a valley, as illustrated, for example, in FIG. 1. At these locations, the settling of solids followed by their sliding down the slope during a protracted shutdown can result in a compacted plug of material difficult, if not impossible, to move or resuspend. In the illustrated pipeline configuration, such solids would slide downwardly into the valley formed between hills or mountains 12 and 13. The solid material would then compress under its own weight to form a plug in the valley in an obvious manner.

Such plug formation is prevented in accordance with the teachings of the present invention as follows. Along the inclined portions of the pipeline 11, a plurality of automatic shutoff valves 21—26 are provided at spaced intervals. Valves 21—26 during slurry flow are maintained in an open condition. The valves may be of any known commercially available type, responsive to close automatically when the pipeline flow rate falls below some predetermined minimum value. This cutoff rate would, of course, be determined by such operating conditions as inclination of the pipeline section, the relative specific properties of the slurry solids and liquids, etc. The shutoff valves, for reasons which will be explained in greater detail below, require no elaborate closing sequence and may be substantially changed from a fully open to a fully closed condition without introducing surge into the pipeline.

Figure 2:
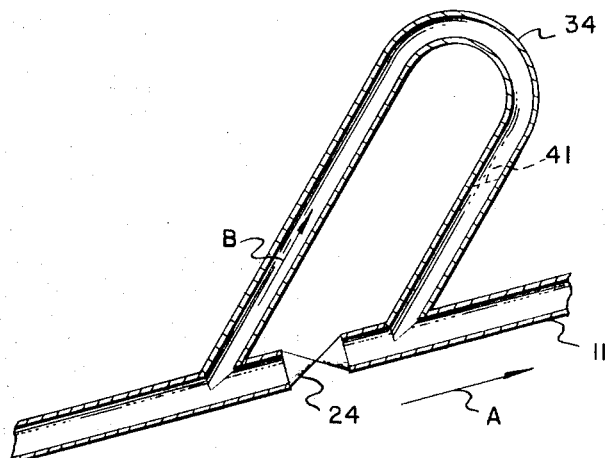
FIG. 2 is an enlarged cross-sectional view in longitudinal projection illustrating an inclined portion of the pipeline section of FIG. 1 with an automatic shutoff valve and a bypass line in operative association therewith in accordance with the teachings of the present invention.

In the vicinity of each shutoff valve, a bypass line is provided for the slurry to take an alternate flow path upon closing of the valve. In FIG. 1, such bypass lines are indicated by reference numerals 31—36. One such bypass line, i.e., bypass line 34, is illustrated in greater detail in FIG. 2 and reference should be had to that figure for a proper understanding of the present invention. For purposes of simplicity, the operation of only bypass line 34 will be described. The operation of the other bypass lines associated with pipeline 11 will, of course, be similar. As the flow rate of the slurry in pipeline 11 will, of course, be similar. As the flow rate of the slurry in pipeline 11 falls below some predetermined minimum value, as for example, due to a line shutdown for repair purposes, a conventional flow meter or similar arrangement (not shown) senses this condition and causes valve 24 to close automatically. All of the valves in pipeline 11 would similarly close at substantially the same time. Due to the inertia of the slurry material in the line and since in-line flow through pipeline 11 is terminated a portion of the slurry material will enter into each bypass line until the inertial energy of the slurry is dissipated due to the upward flow thereof into the bypass line. In FIG. 2, for example, it will be assumed that the flow of slurry material in pipeline 11 is in the direction of arrow A. As the flow rate of the slurry in the pipeline 11 falls below a predetermined minimum value, a portion of the slurry moves into the alternate flow path defined by bypass line 34 in the direction of arrow B. It should be noted that the bypass line loops in such a manner that the flow path defined thereby communicates with the interior of pipeline 11 on both the upstream and downstream sides of valve 24. The configuration and height of bypass line 34 must be chosen in such a manner as to ensure that the inertial energy of the slurry does not carry this material to the apex of the flow path defined by the bypass line before the inertial energy of the slurry material is dissipated. As all movement of the slurry material in pipeline 11 and the bypass lines gradually ceases, the slurry will seek its natural level under the force of gravity within the bypass lines. In other words, the movement of slurry material will cease with a portion thereof positioned in the uphill leg of each bypass line. In FIG. 2, for example, the upper surface of slurry material in bypass line 34 will lie in the uphill leg of the bypass line as indicated by dotted line 41. Once again, the configuration and height of the bypass lines must be chosen carefully to ensure that the force of gravity does not bring level 41 of the slurry material above the apex of the flow path defined by the bypass line. In other words, the uphill leg of each bypass line must define a storage capacity sufficient to accommodate and retain the slurry therein against downward movement in the pipeline, said slurry material having been introduced into the uphill leg upon pipeline shutdown.

In this manner, any slumping of solid material which may occur upon pipeline shutdown will terminate at each of the valves 21—26, respectively. The valves (and bypass lines) are spaced along pipeline 11 at sufficiently small intervals to ensure that the quantities of solid material slumping at each valve are too small to form plugs in the pipeline. Upon resumption of pipeline flow, all valves in the pipeline will open and the relatively small quantities of solid material that will have slumped at each valve location will readily mix with the liquid phase of the slurry so that transport of the slurry may be readily resumed.

It thus may be seen that the bypass lines 31—36 each perform two major functions in combination with their respective valves. First, no surge is introduced into pipeline 11 upon closing of the valves since upward flow of a portion of the slurry material into the bypass lines dissipates the inertial energy of the slurry. This feature is important since no elaborate closing sequence is required for the shutoff valves which may be of the fully open—fully closed type. Second, the bypass line is of a configuration which will halt downward flow of the slurry when the only driving force is gravity. This permits the ready resumption of slurry transport upon termination of pipeline shutdown. Although the bypass lines have been illustrated in the form of upwardly extending, smoothly curved loops, it is obvious that a wide variety of bypass line shapes are permisssible when carrying out the teachings of the present invention, depending upon the requirements of each operating condition.

As previously stated, the above-described arrangement will not work properly if the height of the compacted slurry collected in the uphill leg of each bypass line exceeds the height of that leg. Thus, the spacing of the bypass lines of the above-described type would be limited by the size of the bypass lines and the amount of slurry found between consecutive bypass lines under normal operating conditions. These requirements may be such that they dictate bypass line numbers and capacities which are technically and/or economically not feasible.

Figure 3:
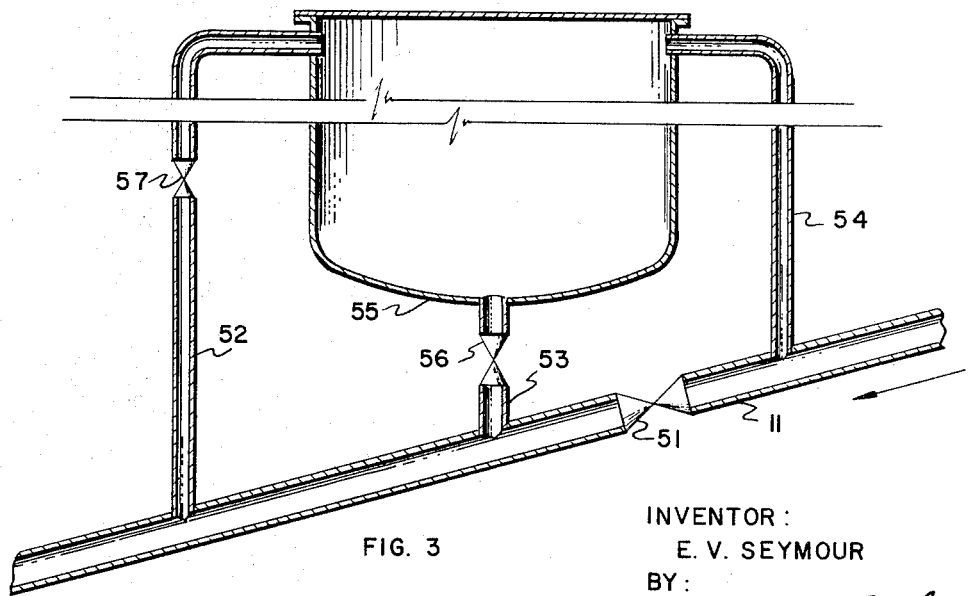
FIG. 3 is a schematic view in longitudinal projection illustrating an alternative form of the present invention.

In FIG. 3 an alternative form of bypass arrangement is illustrated which defines a greater flurry storage capacity than that defined by the first-described arrangement. A section of slurry pipeline 11 is illustrated as having an automatic shutoff valve 51 operatively associated therewith and adapted to completely cut off flow within the line when pipeline flow rate falls below some predetermined minimum value. Communicating with the interior of pipeline 11 and extending upwardly therefrom are conduits 52, 53 and 54 with conduits 52 and 53 lying downhill from valve 51 and conduit 54 communicating with the interior of the pipeline uphill from the valve. Both conduits 52 and 54 communicate at the upper ends thereof with the interior of a storage vessel or tank 55 near the top of the tank; said tank being suitably supported by some known means (not shown) over pipeline 11. Conduit 53, on the other hand, is affixed to the bottom of tank 55, with the flow path defined by conduit 53 being selectively placed in communication with the tank interior by means of a valve 56 disposed in conduit 53 at its upper end. Likewise, a valve 57 is disposed in the upper portion of conduit 52 to control fluid flow therein. Valves 56 and 57 may be of any suitable, commercially available type.

In describing the operation of this arrangement it should be assumed that slurry flow is in the direction of the arrow.

On shutdown valve 51 would close when the pipeline flow rate fell below a predetermined value. Value 56 would remain closed and valve 57 open. (The latter valves, i.e., valves 56 and 57, would be used only at line startup after a shutdown.)

As the flow rate of the slurry falls gradually uphill from valve 51, solids collect in the storage vessel 55 by flowing through conduit 54 until the flow resistance of the bypass arrangement becomes greater than the combined slurry driving force of gravity and inertia, at which time the mean flow rate falls to zero. Flow rate does not fall rapidly to zero, due to inertia of the slurry fluid, and energy stored, via compressibility, in the pipe and slurry fluid. The flow could take 30 minutes, for example, to come to a stop. Since, on shutdown, the flow rate falls gradually to zero, it is likely that all the solids between this bypass and the next bypass upstream would empty into the storage vessel before the means flow rate reached zero.

On start up, the stored slurry in the storage vessel may be emptied slowly back into the pipeline 11 by control of valves 56 and 57, i.e., by opening valve 56 fully and closing valve 57 completely with valve 51 partially closed. Some suitable device (not shown) may be required to break up the compacted solids in the storage vessel before discharge through valve 56. It should be noted that the design of the storage vessel or tank 55 must be such that slurry velocities through the tank, at the commencement of shutdown, must be low enough to allow the solids to drop out before the fluid is discharged at its exit. That is, the flow cross-sectional area must be large compared with the pipe flow cross-sectional area.

I claim as my invention:

1. Apparatus for use in combination with a pipeline adapted to carry a slurry material, including a liquid phase and a solid phase, said pipeline being inclined to the horizontal over at least a portion of its length, said apparatus comprising:

valve means disposed along the inclined portion of said pipeline, said valve means set to close automatically when the pipeline flow rate falls below some predetermined minimum value, thereby halting the flow of slurry material through said pipeline; and bypass means operatively associated with said valve means and said pipeline to provide an alternative flow path for said slurry material upon closing of said valve means whereby surge is prevented in said pipeline, said bypass means being of a configuration which will prevent the downward flow of slurry therethrough under the influence of gravity, thereby preventing slumping of the solid slurry phase at the lowermost end of the inclined pipeline portion;

said bypass means defining a storage capacity sufficient to accommodate and retain therein against downward movement in said pipeline slurry material which is introduced in said bypass means upon shutdown of said pipeline.

2. The apparatus of claim 1 wherein said valve means comprises a plurality of automatic shutoff valves spaced at intervals along said pipeline and said bypass means comprises a plurality of bypass lines, each providing a flow path in communication with the interior of said pipeline on both sides of one of said shutoff valves.

3. The apparatus of claim 2 wherein each of said bypass lines is in the form of an upstanding loop fixedly attached to said pipeline.

4. The apparatus of claim 1 wherein said bypass means includes a storage vessel operatively associated with said pipeline and with a plurality of conduits selectively defining a flow path between the interior of said storage vessel and said pipeline.

5. A method for preventing downhill slumping of the solid phase of a slurry material transported by pipeline, said slurry material including a solid phase and a liquid phase, said method comprising the steps of:

terminating slurry flow in a pipeline;

preventing downward slurry flow in an inclined portion of the pipeline with valve means in said inclined portion;

rerouting slurry flow through at least one alternate flow path around said valve means, said alternate flow path directed upwardly and around said valve means and having sufficient volume to store the slurry entering therein, whereby surge is prevented in the pipeline, said valve means blocking downward gravity flow of the slurry material solid phase in the pipeline to prevent the formation of plugs in the pipeline below said valve means.

6. The method according to claim 11 wherein the slurry flow is terminated in a plurality of locations in the inclined portion of the pipeline.

7. The method according to claim 6 wherein the slurry flow is rerouted into a plurality of alternate flow paths corresponding in number to the number of the plurality of locations in the inclined portion of the pipeline at which slurry flow is terminated.

8. The method according to claim 7 wherein slurry is stored in said flow paths after being rerouted therein.

9. The method according to claim 8 wherein slurry is reintroduced into said pipeline from said flow paths after storage of said slurry.